United States Patent
Messlem et al.

(10) Patent No.: US 6,972,663 B1
(45) Date of Patent: Dec. 6, 2005

(54) METHOD FOR DETECTING PORTABLE OBJECTS AND SYSTEM FOR CARRYING OUT SAID METHOD

(75) Inventors: Omar Messlem, Gardanne (FR); Philippe Porte, Aix en Provence (FR); Denis Praca, Luynes (FR)

(73) Assignee: Gemplus, Gemenos Cedex (FR)

( * ) Notice: Subject to any disclaimer, the term of this patent is extended or adjusted under 35 U.S.C. 154(b) by 0 days.

(21) Appl. No.: 09/890,951

(22) PCT Filed: Jan. 31, 2000

(86) PCT No.: PCT/FR00/00230

§ 371 (c)(1),
(2), (4) Date: Aug. 8, 2001

(87) PCT Pub. No.: WO00/48134

PCT Pub. Date: Aug. 17, 2000

(30) Foreign Application Priority Data

Feb. 9, 1999 (FR) .................................. 99 01521

(51) Int. Cl.[7] .................. H04Q 5/22; H04Q 21/00; G01S 5/04
(52) U.S. Cl. .................. 340/10.2; 340/10.4; 342/445; 343/853
(58) Field of Search .................. 340/10.2, 10.4, 340/10.41, 10.32; 342/445, 455, 423, 434; 343/853, 893; 455/10.33

(56) References Cited

U.S. PATENT DOCUMENTS

| | | | | | |
|---|---|---|---|---|---|
| 5,019,815 | A | * | 5/1991 | Lemelson et al. | 340/933 |
| 5,686,906 | A | * | 11/1997 | Ono et al. | 340/928 |
| 5,698,837 | A | * | 12/1997 | Furuta | 235/492 |
| 6,456,191 | B1 | * | 9/2002 | Federman | 340/10.2 |
| 6,621,410 | B1 | * | 9/2003 | Lastinger et al. | 340/10.42 |

FOREIGN PATENT DOCUMENTS

| | | | | |
|---|---|---|---|---|
| EP | 0543500 | * | 5/1993 | G07C 9/00 |
| EP | 0543500 A2 | | 5/1993 | |
| EP | 0575753 A2 | | 12/1993 | |
| EP | 0632420 A2 | | 1/1995 | |
| EP | 0716399 A1 | | 6/1996 | |
| WO | WO98/16849 | | 4/1998 | |
| WO | WO98/38600 | | 9/1998 | |

* cited by examiner

*Primary Examiner*—Michael Horabik
*Assistant Examiner*—Scott Au
(74) *Attorney, Agent, or Firm*—Buchanan Ingersoll PC

(57) ABSTRACT

A method for detecting portable objects from a network of N antennae controlled by a centralized management unit. Signals are simultaneously emitted by the management unit to all antennae. Resulting response signals from antennae that have detected a portable object are received by the management unit. Each object thus detected is successively selected from these signals according to a pre-established sequence. The invention applies in particular to access control.

9 Claims, 4 Drawing Sheets

METHOD FOR DETECTING PORTABLE OBJECTS AND SYSTEM FOR CARRYING OUT SAID METHOD

This disclosure is based upon, and claims priority from French Application No. 99/01521, filed on Feb. 9, 1999 and International Application No. PCT/FR00/00230, filed Jan. 31, 2000, which was published on Aug. 17, 2000 in a language other than English, the contents of which are incorporated herein by reference.

BACKGROUND OF THE INVENTION

The invention relates to a method of detecting portable objects using a network of N antennae and a detection system implementing the said method.

Hereinafter antenna means the antenna itself but also the electronics, associated with the said antenna, for transmitting and receiving signals.

Portable object means any information carrier of the smart card type provided with an antenna, or any electronic label.

Generally antennae are put in a network when the management unit responsible for taking a decision has to be centralised. This is for example the case when it is sought to effect a physical access control for a dwelling, or access control in the case of a public building. It is also the case when it is wished to keep a trace on an object in a database.

Putting antennae in a network makes it possible not to duplicate the intelligence of the system and reduces the costs of the installation. Use will therefore be made, for this purpose, of a management system including a unit for the centralised management of the network.

Such an organisation is not without difficulties. This is because the centralisation of the intelligence of the system gives rise to problems related in particular to the operating mode of the management unit.

At the present time, putting N antennae in a network is managed by a scrutiny algorithm which successively selects the antennae in order to check the presence of a portable object. The major drawback of this solution is that an antenna is selected even if no portable object is presented to it. This therefore gives rise to a loss of time proportional to the number of antennae in the network, and prevents the management unit from devoting itself to other tasks.

Where several portable objects are detected by the same antenna, the management unit manages this situation by means of an anti-collision algorithm in order to select the portable objects which have been detected by this antenna, one after the other.

When the unit has finished communicating with the portable objects by means of this antenna and when it has adjusted the phenomena of collision on this antenna, it passes to another antenna.

Thus, if a network of 64 antenna, for example, is considered, the minimum time for detecting a portable object in front of an antenna being 25 milliseconds, each antenna is interrogated every 1.6 seconds (64×25 milliseconds).

Where such a system is used in access control, a user must wait up to 1.6 seconds before obtaining a response from the detection system.

The centralisation of the management unit therefore gives rise to problems, notably the problems set out below:

an increase in the complexity of the system due to the management of the scrutiny,
the reaction time extended by the scrutiny of the antennae,
the complex installation, since the management unit must know the configuration of the network,
the antennae are interrogated even if no object is presented,
the number of antennae in the system is limited by the scrutiny time.

The purpose of the present invention is to remedy these problems.

SUMMARY OF THE INVENTION

The first object of the invention is a method of detecting portable objects making it possible to manage a large number of antennae in a manner which is transparent for the management unit.

According to the invention, the management unit must also be provided with a means of successive selection of each portable object detected by the antennae, this means preferably consisting of an anti-collision algorithm, which may be conventional per se.

One object of the invention is more particularly a method of detecting portable objects using a network of N antennae, controlled by a centralised management unit, principally characterised in that it includes the following steps:

the transmission by the management unit of signals simultaneously to all the antennae,
the reception by the said unit of a resulting signal comprising response signals from the antennae which have detected a portable object,
the successive selection of each object detected from this resultant signal, according to a pre-established sequence.

According to another characteristic, the successive selection of each object is effected by the use of an anti-collision algorithm.

According to a variant, the reception of the resulting signal by the management unit is obtained by the reception of the response signals from the antennae respectively at the input point of the unit reserved for each antenna and the adding of the said signals.

According to another variant, the reception of a resulting signal by the management unit is obtained by the reception of the said resulting signal at an input point of the unit reserved for all the antennae in the network.

According to a variant, the reception of the resulting signal includes a step of identifying the origin of the response signals forming the said resulting signal.

The identification of a response signal includes a step of storing the identification of the corresponding antenna known by the input point at which the response signal is received.

In a variant, the storage consists of positioning a flip-flop in a logic state and deactivating it when the unit has come into communication with the portable object detected by the corresponding antenna.

In another variant, the identification of a response signal includes a step of concatenating the identification of the antenna in the response signal sent by the antenna.

Another object of the present invention consists of a system of detecting portable objects including a network of N antennae associated with transmission/reception means and a centralised management unit, principally characterised in that:

the management unit includes:
transmission/reception means connected to the transmission/reception means of the antennae,
the transmission means of the management unit being able to send signals simultaneously to all the antenna, and the reception means of the said unit being able to receive the response signals from the antennae which have detected a portable object, in the form of distinct signals for each antenna or a resulting signal, according to the type of connection established between the transmission/reception means of the management unit and the antennae, and means for successively selecting each portable object detected according to a pre-established sequence.

The means for successively selecting each portable object detected according to a pre-established sequence include an anti-collision algorithm.

According to one embodiment, the transmission/reception means of the management unit and the transmission/reception means of the antennae are connected in point to point mode by connections of the serial transmission type.

According to another embodiment, the transmission/reception means of the management unit include an input point connected to all the antennae by a connection of the serial transmission type.

In the case of the first embodiment, the management unit includes an antenna discriminator.

BRIEF DESCRIPTION OF THE DRAWINGS

Other particularities and advantages of the invention will emerge clearly from a reading of the description given below with regard to the drawings, in which.

DETAILED DESCRIPTION

According to the method of the invention, the management unit OG is able to send simultaneously to all the antennae signals which it transmits and to receive all the responses from the said antennae in the form of a resulting signal S.

Figure 1:
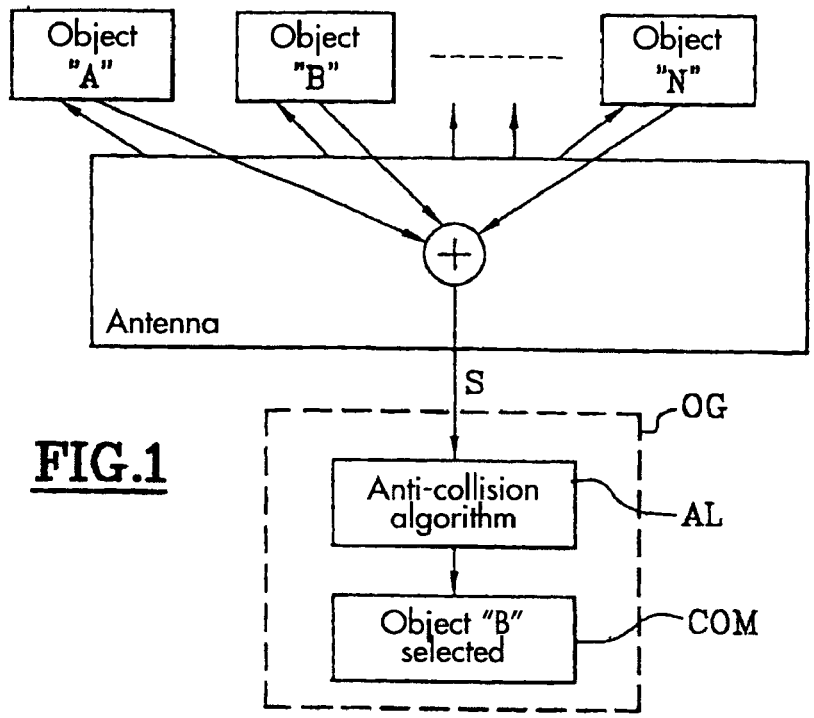
FIG. 1 depicts the outline diagram of the invention.

Thus all the antennae are seen by this management unit OG as a single entity as depicted in FIG. 1.

The management unit OG is also able to successively select the portable objects detected by the said antennae in order to communicate with them (a function bearing the reference COM), this selection taking place in a pre-established sequence.

In practice, the successive selection will be effected by an anti-collision algorithm AL whatever it is.

The anti-collision algorithm AL makes it possible to detect a portable object amongst Q presented to N antennae.

There are many anti-collision algorithms for making a selection according to a pre-established sequence. This sequence may manage for example a degree of priority, that is to say it would make it possible in this case to establish communication with the portable object presented to the antenna with the highest priority amongst the N antennae which had detected a portable object.

The algorithm can also allow communication between the management member and a portable object according to a serial number given in an arbitrary fashion to the antennae and defined by the configuration of the system.

Figure 2:
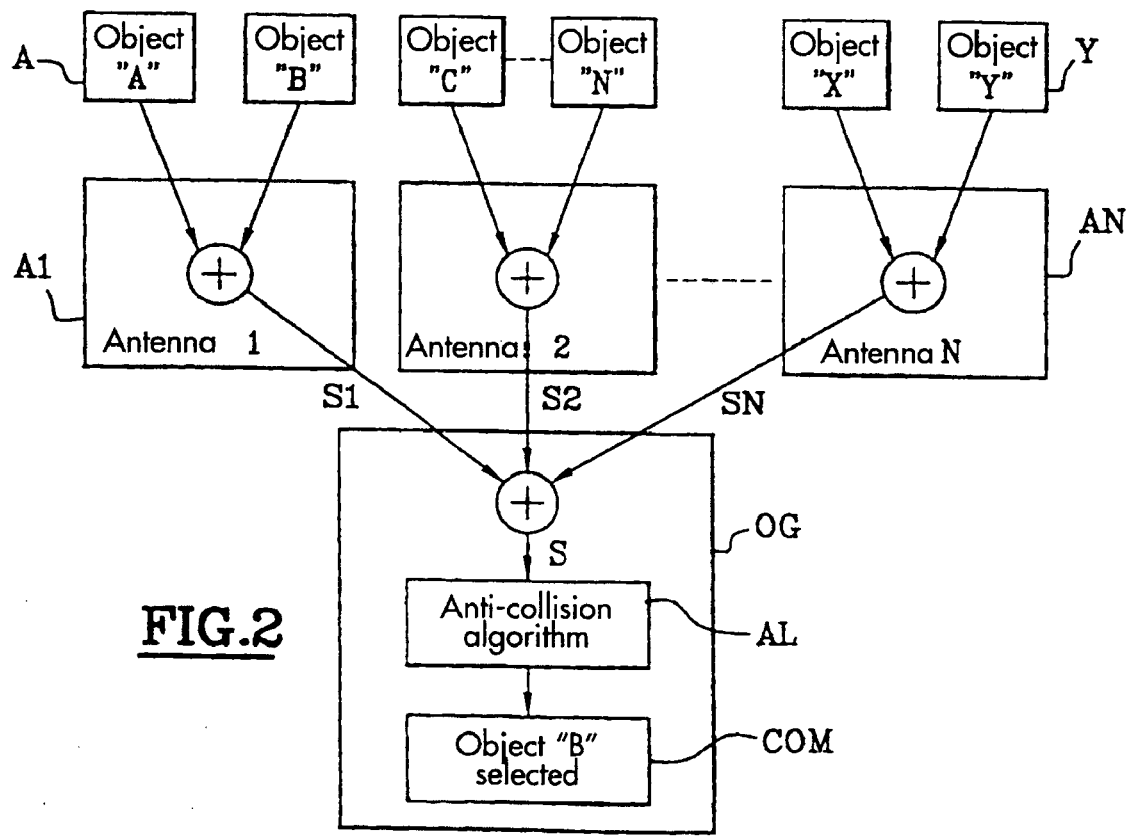
FIG. 2 depicts an outline diagram according to a variant of the invention.

FIG. 2 illustrates a variant of the method according to the invention.

In this variant provision is made for each antenna from A1 to AN to be able to detect one or more objects. This variant in no way changes the principle of the invention. Provision is also made for the connection between the antennae and the management unit to be of the point to point type, as will be seen in more detail with regard to FIG. 3.

To this end the management unit adds the incoming signals so as to see the entire network of antennae as a single entity. This unit receives all the responses S1, S2 to SN from the antennae which have each detected the presence of one or more portable objects and forms a resulting signal S. The anti-collision algorithm will enable the unit to manage the simultaneous arrival of the responses from the network of antennae.

The advantage of the invention is that the concept of scrutiny of the state of the art disappears completely.

Because of this, the time required for establishing communication with a portable object presented in front of any antenna no longer depends on the number of antennae present on the network, but solely on the number of portable objects presented simultaneously and the performance of the anti-collision algorithm.

Another consequent advantage of this invention concerns the possibility of managing priorities. The concept of priority is valid both for the selection of an antenna and for the selection of a portable object.

Finally, this solution does not require multiplication of the number of management units in order to guarantee the performance of a detection system in a network of antennae.

A description will now be given of three embodiments corresponding to implementation systems with different configurations and able to respond to applications which may be different.

Figure 3:
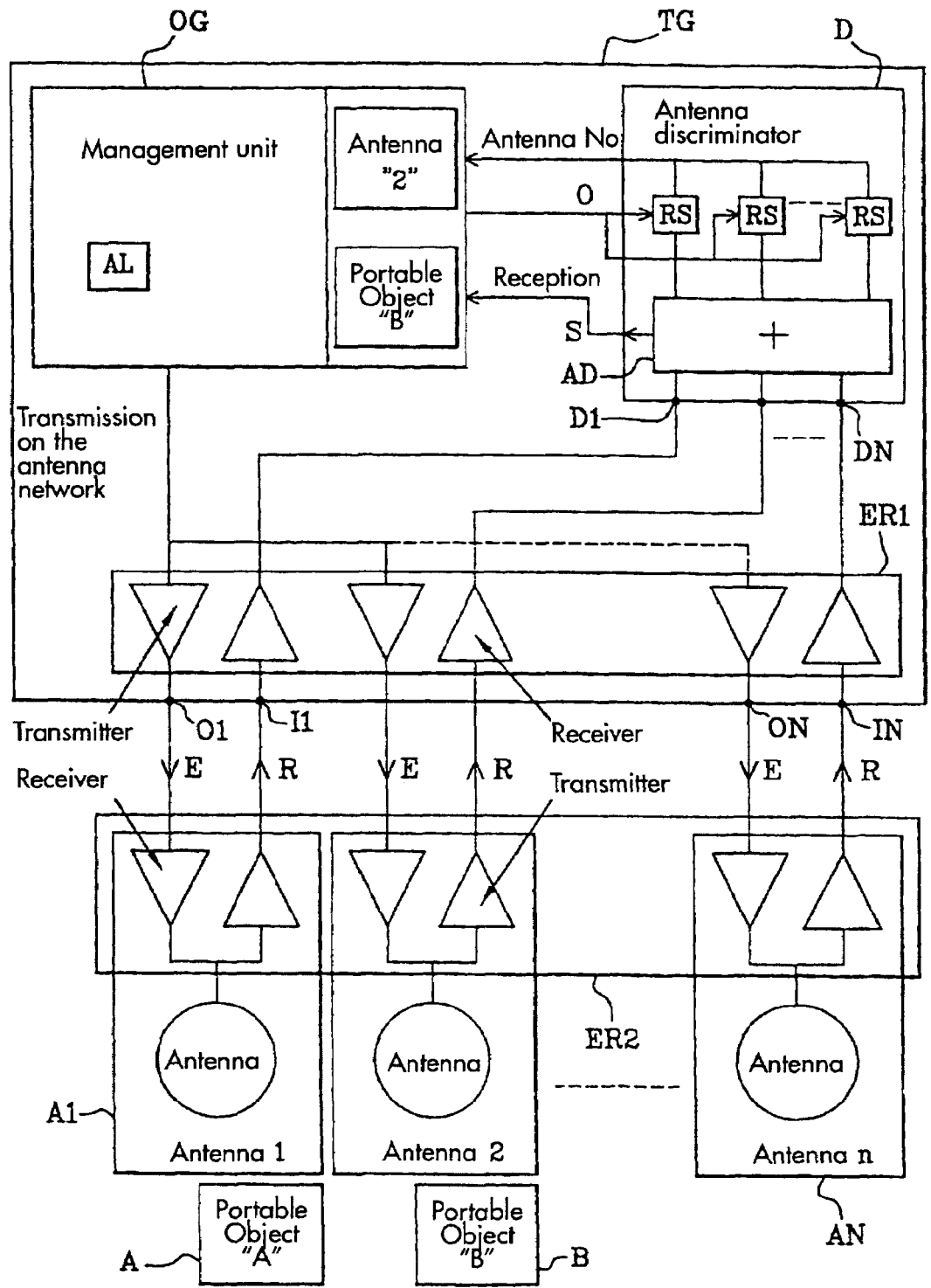
FIG. 3 depicts a first embodiment of the invention.

The first embodiment is shown in FIG. 3.

In this embodiment, there is a system connected with the network of antennae in point to point mode. The connection can be an RS485 or RS422 or RS232 or other link.

The management system TG includes the management unit OG strictly speaking provided with the intelligence for processing and analysing the information received from the portable objects. The management unit simultaneously interrogates all the antennae of the array in order to detect the presence of a portable object. This is represented by all the signals E transmitted at the outputs O1–ON by the transmission/reception device ER1 of the management system TG.

The responses received from the network of antennae are represented by the signals R coming from the transmission/reception circuits ER2 of the network of antennae and arriving at the inputs I1–IN.

Naturally each antenna has its own transmission/reception circuit, but this is shown here schematically in the form of a block, this block illustrating the complete equipment of the network of antennae.

When a portable object A or B is present on any one of the antennae, the information is sent back to the management unit via an antenna discrimination device D which receives all the response signals from the said antennae by means of the input points D1 to DN.

The role of this device D is to collect this set of information issuing from the antennae and to transmit a resulting signal S to the management unit, whilst enabling it to know the origin thereof.

In the example illustrated in this FIG. 3, the antenna A2 has detected a portable object B which has been selected by the anti-collision algorithm AL.

In a practical manner, the antenna discrimination device D has hard-wired logic comprising for example a set of RS flip-flops and an adding device AD. One RS flip-flop is allocated to each antenna in the network.

If, in response to the simultaneous transmission of signals to the network of antenna, several antennae see a return portable object detection signal, the RS flip-flops allocated to these antennae are set to 1, which makes it possible to identify the origin of the return signal, that is to say the antenna which transmitted this signal.

The discriminator D consequently makes it possible to give the identification number of the antenna to the management unit, which will enter into communication with the portable object detected by the said antenna.

The management unit will enter into communication with a selected portable object and reset to zero the state of the RS flip-flop corresponding to the antenna which detected this portable object.

This embodiment is particularly adapted to applications such as access control in a building having entry doors to control and manage and the management of the rights allocated to the different individuals entering this building. This embodiment makes it possible in fact to manage priorities according to the entry doors and the rights allocated to the people entering.

A description will now be given of the second embodiment illustrated by the diagram in FIG. 4.

In this embodiment the connection between the management unit and the network of antennae is for example effected by an I2C bus. The transmission/reception equipment ER1 is of the open collector type in order to superimpose all the response signals S1–SN arriving at the input point I of the management system TG.

The management unit OG is also provided with an anti-collision algorithm AL and intelligence for processing and analysing the information received from the portable objects.

As in the previous case, the management unit makes it possible to simultaneously interrogate all the antennae in the network from its output point O, in order to detect the presence of a portable object.

This embodiment also makes it possible to identify the antennae in the network.

Another difference compared with the embodiment which has just been described with regard to FIG. 3 is that the identification of the antenna is effected by a logic L, conventional per se, placed in each antenna.

In the case of this second embodiment, the anti-collision algorithm is used by the management unit as soon as a return signal received by the transmission/reception system ER1 is received at its input port.

The equipment ER1 in this case makes it possible to supply the resulting signal S to the management unit.

This is because, according to the technology of the equipment, it is possible to have a single input port I at the management unit connected by a connection of the serial transmission type to all the antennae in the network.

This connection will for example be effected by an I2C bus. The technology of the equipment is an open collector technology, which allows the addition of all the response signals transmitted.

Thus, when a portable object is detected on any one of the antennae, the information is sent back directly to the management unit.

The management unit can know the origin of the information since each antenna and more particularly the logic L which each antenna has makes it possible to concatenate the identification information of the said antennae with the messages sent in response to the signals transmitted by the management unit.

Figure 4:
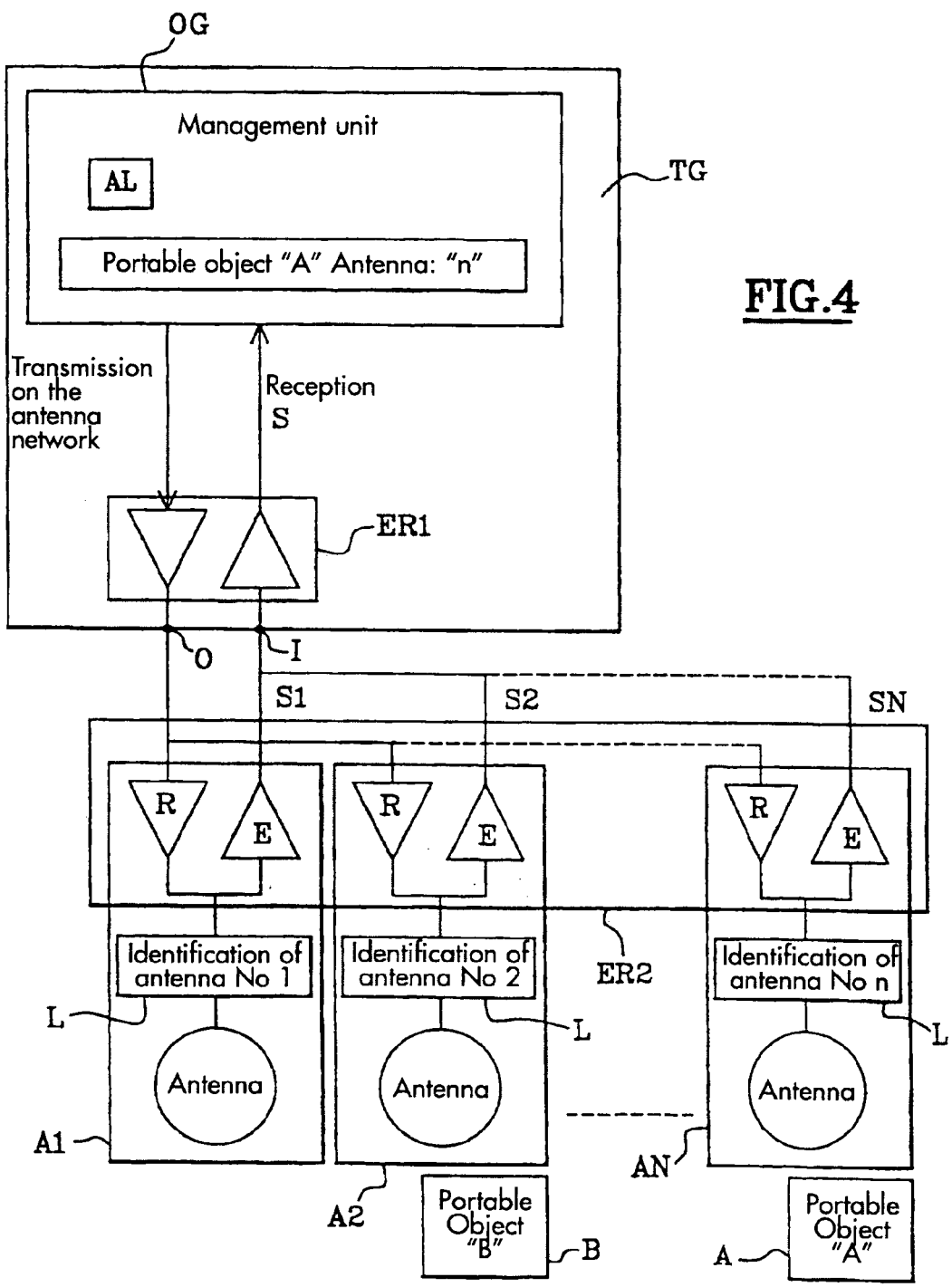
FIG. 4 depicts a second embodiment of the invention.

By way of example, illustrated by FIG. 4, the antenna AN has detected a portable object A selected by the anti-collision algorithm AL in order to enter into communication with this portable object.

This second embodiment covers the same applications as the embodiment depicted by FIG. 3.

Figure 5:
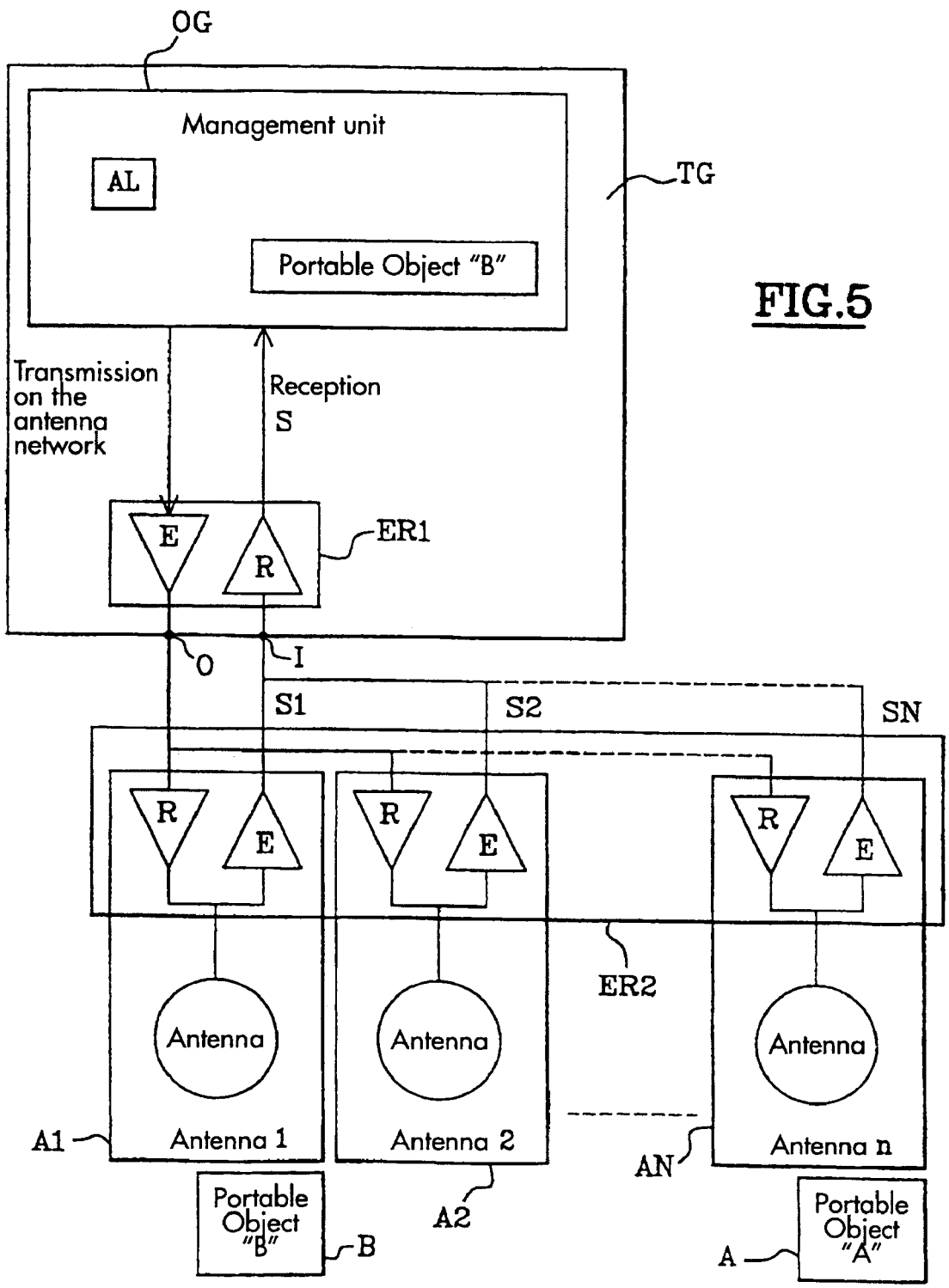
FIG. 5 depicts a third embodiment of the invention.

A third embodiment is illustrated by the diagram in FIG. 5.

In this embodiment there is the same type of connection between the management unit and the antenna network, that is to say a connection of the parallel transmission type with for example an I2C bus. The transmission/reception equipment ER1 of the management unit has a technology of the open collector type allowing the addition of response signals received at the input I so as to supply a resulting signal S to the management unit itself.

The management unit contains the anti-collision algorithm and the intelligence for processing and analysing the information received from the portable objects.

In the same way as in the embodiments described above, this unit simultaneously interrogates all the antennae in the network in order to detect the presence of a portable object.

This embodiment is particularly adapted to the case where it is not necessary to know the origin of the information of the received signals.

It applies particularly in the fields of application such as motorway tolls, anti-theft gates, time stamping (time clock), parking and the counting of objects, etc.

In the example illustrated in this FIG. 5, it can be seen that a portable object B has been selected by one of the antennae in the network by the anti-collision algorithm AL.

As has just been seen, the management proposed by the invention does not have recourse to scrutiny and has the following advantages:
- the response time of the system to the presentation of an object is independent of the number of antennae,
- the complexity of the management unit is independent of the number of antennae,
- any type of anti-collision algorithm can be used for implementing this method,
- the management unit does not need to know the number of antennae installed in the network,
- the intelligence of the antennae can be eliminated completely.

The invention applies to any type of contactless portable object of the ISO 14443-A and ISO 14443-B type, tags (electronic label), operating at frequencies of 13.56 MHz or 125 kHz.

What is claimed is:

1. A method of detecting portable objects using a network of N antennae, controlled by a centralized management unit, comprising the following steps:
   transmitting signals simultaneously to all the antennae from said management unit,
   receiving response signals from the antennae which have detected a portable object respectively at an input port of said management unit that is assigned to each antenna, and adding said signals to form a resulting signal, and
   successively selecting each object detected from this resulting signal, according to a pre-established sequence.

2. A detection method according to claim 1, wherein the successive selection of each object is effected by the use of an anti-collision algorithm.

3. A detection method according to claim 1, wherein the reception of the resulting signal includes a step of identifying the origin of the response signals forming said resulting signal.

4. A detection method according to claim 3, wherein the identification of a response signal includes a step of storing the identification of the antenna associated with the input port at which the response signal is received.

5. A detection method according to claim 4, wherein said storing step includes positioning a flip-flop in a logic state and deactivating it when the unit has entered into communication with the portable object detected by the corresponding antenna.

6. A system of detecting portable objects including a network of N antennae associated with transmission/reception means and a centralized management unit, comprising:

transmission means in the management unit that is connected to transmission/reception means of the antennae and that sends signals simultaneously to all the antennae, reception means in said unit that is connected to said transmission/reception means and that receives response signals from the antennae which have detected a portable object, in the form of distinct signals for each antenna respectively at an input port of said management unit that is assigned to each antenna, and adds said signals to form a resulting signal, and means for successively selecting each portable object detected according to a pre-established sequence.

7. A detection system according to claim 6, wherein the means for successively selecting each portable object detected in a pre-established sequence includes an anti-collision algorithm.

8. A detection system according to claim 6 wherein the transmission and reception means of the management unit and the transmission/reception means of the antenna are connected in point-to-point mode by connections of the serial transmission type.

9. A detection system according to claim 8, wherein the management unit includes an antenna discriminator.

* * * * *